Aug. 6, 1946.   D. N. EVANS   2,405,120
BEARING SEAL CARTRIDGE
Filed May 1, 1944   2 Sheets-Sheet 2
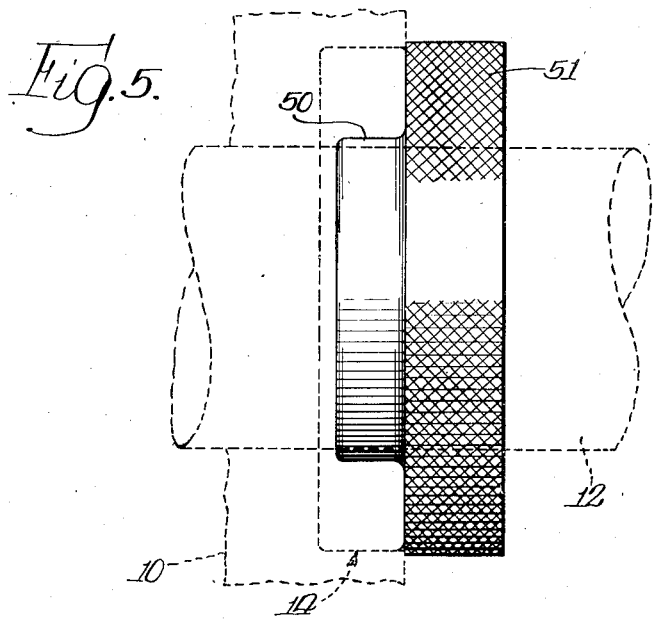
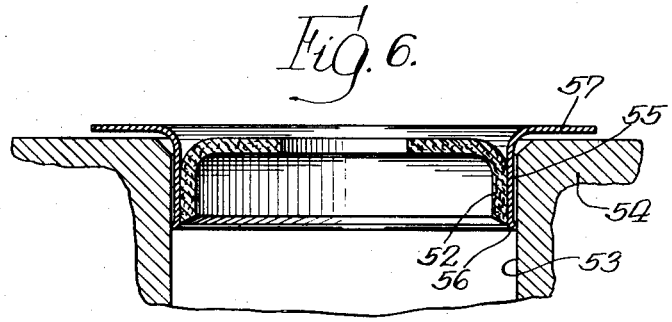
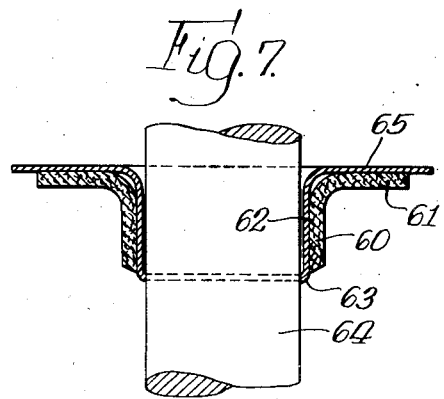
INVENTOR.
Douglas N. Evans,
BY
Davis, Lindsey, Smith & Shonts
Atty's.

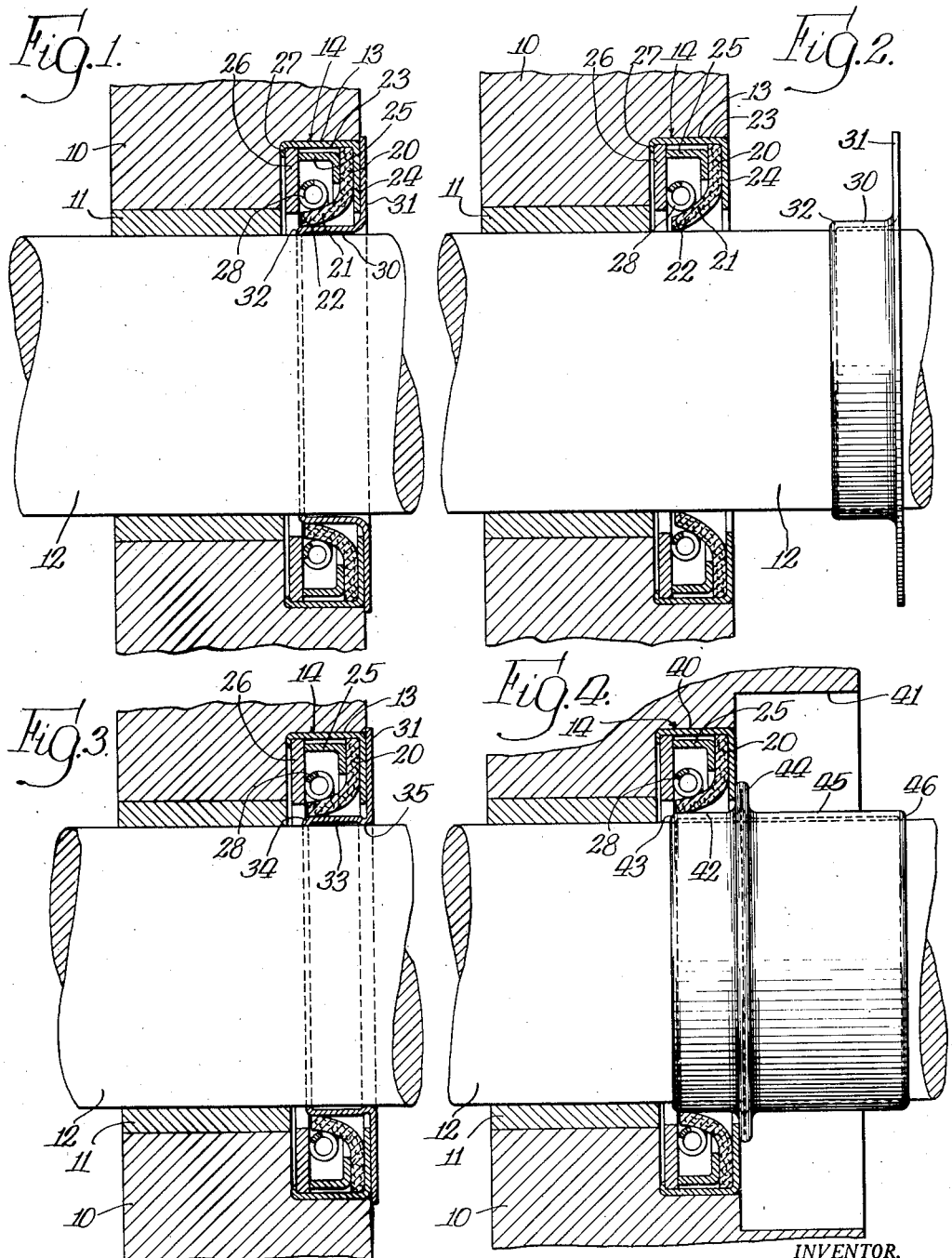

Patented Aug. 6, 1946

2,405,120

UNITED STATES PATENT OFFICE 2,405,120

BEARING SEAL CARTRIDGE

Douglas N. Evans, Gary, Ind.

Application May 1, 1944, Serial No. 533,470

4 Claims. (Cl. 286—1)

The invention relates generally to bearing seals and more particularly to an annular bearing seal having a flexible sealing member provided with a lip adapted to engage a relatively moving part.

The general object of the invention is to provide a bearing seal including a self-contained pilot element enabling the seal to be easily and quickly applied without damage to the flexible sealing member, the arrangement being such that the pilot element may be removed and discarded after application of the seal.

It is also a general object to provide a pilot for such a seal, which protects the seal in the handling of it, which avoids the necessity of utilizing grease to facilitate placing the seal on the rotating part, and which eliminates the chance of damage to the flexible sealing member when the seal is pressed into place.

Another object is to provide a bearing seal of the foregoing type which is provided with a pilot assembled with the seal prior to use of the latter, whereby the pilots and seals may be uniformly assembled with a minimum distortion and marring of the flexible sealing members.

A further important object is to provide a bearing seal and pilot therefor, with the pilot of such construction that the flexible sealing member of the seal is subjected to a minimum of handling or rubbing in placing the seal in its operative position, thereby reducing the chance of damaging the sealing member in installation.

Still another object is to provide a novel method of placing a bearing seal of the foregoing type in its operative position, by which the maximum effectiveness of the flexible sealing member is attained.

A still further object is to provide a novel pilot for use in placing a bearing seal of the foregoing type in its operative position, which may be constructed for use with a bearing seal to be placed in a relatively inaccessible position.

Another object is to provide a novel pilot adapted for use not only with bearing seals of the foregoing type but also with seals of the type utilizing cupped or flanged leathers.

Other objects and advantages will become apparent from the following description taken in connection with the accompanying drawings, in which:

Figure 1 is a sectional view through a bearing provided with a bearing seal embodying the features of the invention and showing a pilot utilized in positioning the seal;

Fig. 2 is a view similar to Fig. 1 but showing the pilot removed from the seal;

Fig. 3 is a view similar to Fig. 1 but showing a modified form of pilot;

Fig. 4 is a view similar to Fig. 1 but showing a pilot utilized when the bearing seal is placed in a relatively inaccessible position;

Fig. 5 shows another form of pilot;

Fig. 6 is a transverse sectional view showing the manner of placing a cupped leather seal by the use of a pilot embodying the features of the invention; and Fig. 7 shows the manner of positioning a flanged leather seal with a pilot of such character.

In a machine structure in which a shaft projects through and is supported by the wall of a gear casing or the like, or where bearings are employed between two relatively rotatable parts, it is standard practice today to provide one or more bearing seals to prevent oil or grease from working out of the casing or bearing and to prevent dirt or other foreign matter from entering the casing or bearing. Seals of this character are used particularly when the oil or grease is held under pressure. One prominent use of such seals is in motor cars where seals are used at numerous points in the operating mechanism.

A bearing seal of the character herein contemplated comprises a flexible sealing member, usually leather or fabric, in the form of a ring which is either dished or flanged, depending upon the particular installation, to provide a wiping lip having a relatively sharp edge and extending axially of the shaft or other part around which a seal is desired. The flexible sealing member is carried in an annular casing structure which is usually positioned in a recess in the part which supports the shaft. The annular casing structure is fixed in such recess as by a press fit so that the relative rotation occurs between the flexible sealing member and the shaft.

The flexible sealing member is dimensioned so that its inner diameter when not expanded is slightly less than the diameter of the shaft on which it is placed. Thus, by slightly expanding the sealing member, a slight contracting pressure, which may be augmented by a spring, is exerted on the shaft, and a proper seal is thereby provided. Its effectiveness as a seal depends upon the uniformity and smoothness of the contacting surface of the flexible sealing member. Because of this fact, it is obvious that care must be used in placing the seal in operative position to prevent damage to the contacting surface. There is danger of damaging such surface by moving the seal longitudinally along the shaft because of the chance of cutting the surface by burrs on the end of the shaft and the sharp edges at keyways or splines. Further damage may be done to the surface by the mere abrasion due to the movement of the flexible sealing member along the shaft.

Pilots have heretofore been provided which fit over the ends of the shaft to facilitate placing the seal on the shaft. One form of pilot heretofore employed comprises a member which is the size of the shaft but having a tapered outer end to force through the seal, the inner end of the pilot fitting snugly against the end of the shaft so that the seal may be moved first along the pilot and then onto the shaft. Such a form prevents cutting of the contacting surface of the flexible sealing member by burrs on the end of the shaft.

A second form of pilot heretofore used comprises a body portion of slightly larger diameter than the shaft and having a tapered outer end over which the seal is first moved. The inner end of the pilot is tubular and fits over the end of the shaft. The tubular portion is made of sufficient length to extend over any keyways or splines that may be cut in the end of the shaft. Obviously, such form of pilot will prevent the sharp edges at the keyways and splines from cutting the flexible sealing member.

But neither of these forms of pilots avoids the abrasion that occurs by moving the seal longitudinally along the shaft. In fact, they increase such abrasion because in effect they increase the length of the shaft. Furthermore, the end of the shaft on which such pilot was placed had to be shaped to fit the pilot.

In using pilots of either of these forms, unnecessary and undesirable distortion of the flexible sealing member frequently occurs in moving the seal along the shaft, since these pilots are used by ordinary workmen in a plant manufacturing the article utilizing the seal or in repair work. Thus, the effectiveness of the seal is considerably less than it might be if these faults were avoided. Pilots of this character, which are fairly expensive, may become lost, resulting in use of less careful methods of placing seals in position. Furthermore, such pilots become marred by careless handling and thereby cause greater damage to the contacting surface of the flexible sealing member.

The present invention contemplates the provision of a pilot in the form of a self-contained element of the seal, which fully protects the contacting surface of the flexible sealing member until the seal is in its final or operative position but does not do so by dragging the flexible sealing member in placing the seal on the shaft. It therefore eliminates all the rubbing between the contacting surface and the shaft due to movement of the seal into its final position, and the pilot is so positioned in the seal that very slight movement of the contacting surface on the pilot is required in separating the two. Furthermore, the pilot is of such inexpensive construction that each seal may be provided with its own pilot, thereby enabling assembly of the seal and pilot in the factory in which the seal is made. Such assembly obviously may be performed with more care than would ordinarily be exercised with pilots of the type mentioned above.

After the seal and pilot are moved to the final or operative position of the seal, the pilot may then be removed and, because of its inexpensive construction, may be discarded. Seals with pilots of this character are therefore particularly useful to supply the needs of the armed forces.

In Fig. 1 of the drawings, I have shown a bearing and bearing seal provided with a pilot embodying the invention. Thus, for purposes of illustration, there is shown a fixed part 10 provided with a bearing 11 rotatably supporting a shaft 12. The fixed member 10 is provided with a recess 13 to receive a bearing seal, indicated generally at 14, which serves to prevent oil or grease from working out of the bearing 11 toward the right and likewise prevents dirt or other foreign matter from working into the bearing from the right side, as shown in that figure.

The bearing seal in the present instance comprises a flexible sealing member 20 of annular form which is dished or flanged as at 21 and cut at such an angle as to provide a relatively sharp edge or wiping lip 22 adapted to contact the shaft 12 and thereby provide a seal. The flexible sealing member is supported by a casing structure 23 having an inwardly directed flange 24 against which the flexible sealing member 20 lies. The casing member 23 is of such diameter as to fit into the recess 13 with a pressed fit. The flexible sealing member 20 is clamped against the inner face of the flange 24 by an annular holding member 25 which is L-shaped in cross section and is held within the casing 23 by means of an annular cover plate 26, the edge of the casing structure 23 being peened over, as at 27, to hold the cover member 26 in place.

The inner diameter of the wiping lip 22 is normally slightly less than the diameter of the shaft 12 but, since the sealing member 20 is made of a flexible material, it may be stretched or expanded sufficiently to embrace the shaft 12 and exert a slight contracting pressure thereon. While in some forms of seals the resiliency of the flexible sealing member is relied upon to provide the proper seal, in the present instance a coiled spring 28 of annular form is wrapped around the flexible sealing member to exert a contracting force thereon. The spring 28 is held within the casing structure by the cover member 26.

Obviously, the wiping lip 22 of the flexible sealing member is apt to be unduly distorted in placing it on the shaft and moving it into its operative position. Furthermore, the abrasion due to the movement of the wiping lip along the shaft or the cutting thereof by any sharp corners on the shaft will destroy the effectiveness of the wiping lip as a seal.

To avoid these disadvantages, I provide a pilot which supports the wiping lip 22 until the seal is in its final or operative position, as shown in Fig. 1. Such pilot comprises an annular body portion in the form of a cylindrical sleeve 30 fitting over the shaft 12 and adapted to be inserted within the flexible sealing member 20. The cylindrical sleeve 30 is relatively thin so as not to unduly expand the wiping lip 22 of the flexible sealing member. To hold the sleeve 30 in fixed relation to the wiping lip 22 so that there is no rubbing action therebetween once the sleeve is inserted, the sleeve is provided with an annular flange 31 extending radially outward and adapted to abut against the front or outer face of the seal. Thus, the pilot will be held in fixed relation to the seal.

In order to permit the wiping lip 20 of the flexible sealing member to be slid smoothly off the end of the cylindrical sleeve 30, the inner end of the sleeve is rounded to provide a curved lip 32. The curved lip 32 is dimensioned to fit snugly on the shaft 12 and thus hold the pilot and bearing seal in proper relation thereto during movement along the shaft.

Since the pilot is made of relatively thin metal and is annular in form, it may be manufactured from sheet metal subjected to a simple drawing operation to form the cylindrical sleeve portion 30. The bottom of the drawn portion thus will provide the curved lip 32 which may be punched to the proper diameter to fit snugly on the shaft 12. The pilot thus may be made of relatively inexpensive metal which lends itself to an inexpensive mode of manufacture. In fact, pilots of this character may be made at such a low cost that each bearing seal may be provided with its own pilot and the pilot discarded after the seal is in place. This insures a pilot being available for placing each seal in position and, further, is insurance against any damage being done to the wiping lip 22 during the placement of the seal. Furthermore, since each seal is provided with its own pilot, the pilot may be placed at least partially within the seal by the manufacturer of the the seal. The greatest care may then be exercised in placing the pilot within the seal to avoid any chance of damage to the wiping lip 22.

When a user obtains a seal provided with a pilot of this character, he first slides the seal and pilot over the end of the shaft and moves the two together as a unit into the final position for the seal. The pressing of the seal into the recess 13 will not disturb the relation between the pilot and the wiping lip since the flange portion 31 of the pilot is in abutment with the casing structure 23. When the seal has been so positioned, the pilot may then be readily removed by sliding it out of contact with the wiping lip 22, as illustrated in Fig. 2. By so drawing the pilot, the wiping lip 22 slides over the curved lip 32 of the pilot and immediately contracts into sealing engagement with the shaft 12. The pilot then may be removed from the end of the shaft and discarded.

In Fig. 3 of the drawings, there is shown a pilot cooperating with a bearing seal of the same character as shown in Figs. 1 and 2, the pilot, however, having a somewhat modified form which holds the seal in accurate axial alignment with the shaft throughout the movement of the seal and pilot along the shaft. Thus, the pilot in this instance comprises a cylindrical sleeve portion 33 having a curved lip 34 at its inner end. At the outer end of the cylindrical sleeve portion 33, an inwardly directed annular bead 35 is provided. The curved lip 34 and the bead 35 are dimensioned to fit snugly on the shaft and thus provide support for the pilot and bearing seal at axially spaced points maintaining the desired alignment between the seal and shaft.

The form of pilot shown in Fig. 4 is utilized where the bearing seal is to be placed in a relatively inaccessible recess. To illustrate such a position, the bearing seal is shown as placed in a recess 40 which is located inwardly from a larger recess 41 in the fixed part which supports the shaft. In this instance the pilot comprises a cylindrical sleeve portion 42 supporting the wiping lip of the flexible sealing member of the bearing seal, and provided with a curved lip 43 at the inner end of the cylindrical sleeve portion 42. At the outer end of the cylindrical portion 42 is a flange 44 adapted to abut against the front face of the bearing seal and beyond that is a tubular portion 45 of sufficient length to extend outwardly beyond the recess 41. The outer end of the tubular portion 45 may be provided with an inwardly curved lip 46 to fit snugly on the shaft, which with the lip 43 provides support for the pilot and bearing seal at axially spaced points. The pilot in this instance may be readily manufactured by cutting a length of thin walled tubing, collapsing or folding such tubing at an intermediate point to provide the flange 44, and then curving the ends of the tubing inwardly to provide the curved lips 43 and 46.

In Fig. 5 I have shown a pilot which is designed for repeated use. A pilot of this character is preferably made of machined metal and comprises a relatively thin cylindrical portion 50 to be inserted within the flexible sealing member of the bearing seal. The cylindrical portion 50 extends from an enlarged portion 51 of substantial thickness which is preferably roughened as by knurling so that it may be readily grasped in the hand to facilitate its insertion into the bearing seal and the placement of the seal on the shaft. The enlarged portion 51 is adapted to abut against the end face of the bearing seal and thus hold the cylindrical portion 50 and the wiping lip of the seal in fixed relation. While this form does not have the advantage of inexpensive construction, it fully protects the wiping lip of the bearing seal from the abrasion due to movement along the shaft.

In Figs. 6 and 7, I have shown a pilot of the character herein contemplated used with cupped and flanged leathers frequently employed in seals for rotating or longitudinally slidable parts. Thus, in Fig. 6, I have shown a pilot as used with a cupped leather 52 to insert it within a cylindrical bore 53 of a fixed part 54, such as a pump cylinder block. The pilot in this instance comprises a cylindrical bore 55 embracing the cupped portion of the leather. At its inner end the cylindrical portion 55 is provided with an outwardly turned curved lip 56 fitting snugly within the cylindrical bore 53. The other end of the cylindrical portion 55 is formed into an outwardly projecting flange 57.

In Fig. 7, the leather comprises a cylindrical portion 60 having an outwardly turned flange 61. The pilot in this instance comprises a sleeve portion 62 fitting within the cylindrical portion 60 of the leather and provided at its inner end with an inwardly curved lip 63 dimensioned to fit over a shaft 64 on which the leather is to be placed. The pilot likewise includes an outwardly directed flange portion 65 which abuts against and supports the flange 62 of the leather. In each of these forms, the pilot supports the flexible wiping portion of the leather during placement in its operative position and prevents damage thereto in moving longitudinally into its final position.

From the foregoing it is apparent that I have provided a bearing seal with its own pilot section which distorts the sealing member only slightly and which fully protects the sealing member while being moved into place. Thus, the contacting surface of the sealing member, on which the effectiveness of the seal depends, is prevented from being cut or abraded in any way which would reduce its effectiveness. The pilot in the forms shown in Figs. 1 to 4, inclusive, 6 and 7, is of such inexpensive construction that each seal may be provided with its own pilot, thus insuring the fact that the seal may be placed in position by means of such a pilot. Such inexpensive construction permits the pilot to be discarded after use.

I claim:

1. A bearing seal cartridge comprising, in combination, an annular flexible sealing member shaped to provide a wiping lip adapted to extend generally axially of and in engagement with a rotatable member, and a pilot comprising a cylindrical sleeve within said sealing member and adapted to be slid over the rotatable member in moving the seal into position on the rotatable member, said pilot being adapted to be removed from the seal after the seal is in its operative position whereby the wiping lip is prevented from moving axially in contact with the rotatable member, said pilot having a radial flange abutting against said seal to prevent shifting of the sleeve relative to the sealing member during placement of the seal on the rotatable member.

2. A bearing seal cartridge comprising, in combination, an annular flexible sealing member shaped to provide a wiping lip adapted to extend generally axially of and in engagement with a rotatable member when in operative position, and a pilot movable with the seal as a unit into said operative position to prevent the sealing member from rubbing on the rotatable member during placement of the seal, said pilot being then removable from the seal, said pilot comprising a cylindrical sleeve inserted within the sealing member with the wiping lip positioned closely adjacent one end of the sleeve to provide a minimum of rubbing therebetween on removal of the pilot, the other end of the sleeve having a radial flange abutting against the seal to prevent shifting of the sleeve relative to the wiping lip during placement of the seal on the rotatable member.

3. A bearing seal cartridge comprising, in combination, an annular flexible sealing member shaped to provide a wiping lip adapted to extend generally axially of and in engagement with a rotatable member when in use, and a pilot movable with the seal as a unit into operative position on said rotatable member to avoid rubbing of the wiping lip along the rotatable member during placement of the seal, said pilot comprising a cylindrical sleeve inserted within the sealing member and having an inwardly curved lip at one end with the wiping lip positioned closely adjacent said curved lip to provide a minimum of rubbing of the wiping lip on the sleeve and to permit the wiping lip to immediately contract on removal of the pilot, the other end of the sleeve having a radial flange in abutment with the seal to prevent shifting of the sleeve relative to the wiping lip during placement of the seal on the rotatable member.

4. A bearing seal cartridge comprising, in combination, an annular flexible sealing member shaped to provide a wiping lip adapted to extend generally axially of and in engagement with a rotatable member when in use, a casing structure supporting said sealing member and adapted to be rigidly positioned in the structure in which the rotatable member is supported, and a pilot comprising a cylindrical sleeve inserted within said sealing member and supporting said wiping lip to prevent rubbing contact thereof with the rotatable member during placement of the seal, and a radial flange extending from the sleeve and in abutment with said casing structure to prevent shifting of the sleeve relative to the wiping lip during placement of the seal.

DOUGLAS N. EVANS.